United States Patent
Shah et al.

(10) Patent No.: US 11,978,082 B1
(45) Date of Patent: May 7, 2024

(54) SYSTEM AND METHOD OF INDIVIDUALIZED OFFER EXECUTION AT A SCALE

(71) Applicant: Loyalty Juggernaut, Inc., Palo Alto, CA (US)

(72) Inventors: Kalpak Shah, Palo Alto, CA (US); Azeem Mohammed, Hyderabad (IN); Shyam Shah, Palo Alto, CA (US)

(73) Assignee: Loyalty Juggernaut, Inc., Palo Alto, CA (US)

( * ) Notice: Subject to any disclaimer, the term of this patent is extended or adjusted under 35 U.S.C. 154(b) by 0 days.

(21) Appl. No.: 18/218,304

(22) Filed: Jul. 5, 2023

(51) Int. Cl.
*G06Q 30/02* (2023.01)
*G06Q 30/0204* (2023.01)
*G06Q 30/0207* (2023.01)

(52) U.S. Cl.
CPC ..... *G06Q 30/0224* (2013.01); *G06Q 30/0205* (2013.01); *G06Q 30/0236* (2013.01); *G06Q 30/0239* (2013.01)

(58) Field of Classification Search
CPC ............... G06Q 30/02; G06Q 30/0224; G06Q 30/0205; G06Q 30/0236; G06Q 30/0239; G06Q 30/0254; G06Q 10/067; G06Q 30/0246; G06Q 30/0207
See application file for complete search history.

(56) References Cited

U.S. PATENT DOCUMENTS

| | | | |
|---|---|---|---|
| 7,881,959 B2 * | 2/2011 | Ramsey | G06Q 10/0631 705/7.12 |
| 10,304,070 B2 * | 5/2019 | Newnham | G06Q 30/0239 |
| 11,244,340 B1 * | 2/2022 | Morin | G06Q 30/0224 |

(Continued)

FOREIGN PATENT DOCUMENTS

| | | | | |
|---|---|---|---|---|
| CN | 102737333 A | * | 10/2012 | G06Q 30/02 |
| WO | WO 2008/064343 A1 | * | 5/2008 | G06Q 10/00 |
| WO | WO 2023/091519 A1 | * | 5/2023 | G06N 20/00 |

OTHER PUBLICATIONS

S.M. Peiris; N. Wickramasurendra; S. De Silva; S. Abeysekera; A. De Silva; J. Jeeth, JANSSS: Automated Marketing Campaign Predictions based on User Data Analysis (English), 2021 Asian Conference on Innovation in technology (ASIANCON) (pp. 1-6), Aug. 27, 2021 (Year: 2021).*

(Continued)

*Primary Examiner* — Marilyn G Macasiano

(57) ABSTRACT

A method for executing an individualized offer for each member ID in a plurality of target segment are provided. The method (i) identifying a target segment for each member ID from the plurality of target segments using a machine learning and analytics model, (ii) selecting a base offer from a plurality of base offers for the target segment, (iii) generating a rule for the base offer associated with the target segment from a rules database, (iv) selecting a set of attributes for the target segment, (v) applying the set of static attributes and the set of mathematical attributes on the base offer, (vi) generating individualized segments of each member ID based on product attributes matching using the rule generated for the target segment, (vii) calculating differential offers for each member ID in the target segment based on to automatically executing the individualized offers for each member ID in target segment.

19 Claims, 14 Drawing Sheets

(56) References Cited

U.S. PATENT DOCUMENTS

| | | | |
|---|---|---|---|
| 2005/0189415 A1* | 9/2005 | Fano | G06Q 30/02 |
| | | | 705/14.69 |
| 2017/0243244 A1* | 8/2017 | Trabelsi | G06Q 30/0255 |
| 2018/0101860 A1* | 4/2018 | Fleming | G06Q 30/0239 |
| 2018/0211270 A1* | 7/2018 | Wu | G06Q 30/0269 |

OTHER PUBLICATIONS

Antony R. L; Sharath K. P; Thirunavukkarasu. J; AsrithRahul. T. S; Parthiban. M; Vijay K, M, A Novel Machine Learning Approach to Predict Sales of an Item in E-com (Engl), 2022 International Conf on Innovative Computing, Intelligent Comm and Smart Electrical Sys (ICSES) (pp. 1-7), Jul. 15, 2022 (Year: 2022).*

Pufahl, Luise; Ihde, Sven; Stiehle, Fabian; Weske, Mathias; Weber, Ingo, Automatic Resource Allocation in Business Processes: A Systemic Literature Survey: (English), Jul. 15, 2021 (Year: 2021).*

Gubela, Robin M.; Lessmann, Stefan; Jaroszewicz, Szymon, Response Transformation and Profit Decomposition for Revenue Uplift Modeling (English), European Journal of Operational Research 2019, Nov. 20, 2019 (Year: 2019).*

* cited by examiner

| personalization | Value |
|---|---|
| Product category | DRY_FOOD |
| Spend objective | 300 |
| Reward rate | 0.40 |

FIG. 6

| MEMBER ID | SEGMENT ID | OFFER ID | SEGMENT ATTRIBUTES |
|---|---|---|---|
| M1234 | VEGETARIAN | O1 | {"Spend threshold": 100, "Reward rate": 20, "category": FVG} |
| M1235 | VEGETARIAN | O2 | {"Spend threshold": 50, "Reward rate": 10, "category": FVG} |
| M1236 | VEGETARIAN | O3 | {"Spend threshold": 70, "Reward rate": 15, "category": FVG} |
| M1237 | VEGETARIAN | O4 | {"Spend threshold": 150, "Reward rate": 30, "category": FVG} |

| MEMBER ID | SEGMENT ID | OFFER ID | SEGMENT ATTRIBUTES |
|---|---|---|---|
| M1234 | VEGETARIAN | O1S | {"Spend threshold": 100, "Reward rate": 20, "category": FVG} |
| M1234 | VEGETARIAN | O1A | {"Spend threshold": 20, "Reward rate": 10, "category": FVG} |

DYNAMICALLY EVALUATING THE INDIVIDUALIZED OFFER FOR EACH MEMBER ID IN THE TARGET SEGMENT BASED ON THE RULE THAT IS GENERATED FOR THE BASE OFFER ASSOCIATED WITH THE TARGET SEGMENT IN REAL-TIME WHILE PROCESSING TRANSACTIONAL DATA OF EACH MEMBER ID, THE DYNAMIC EVALUATION OF THE INDIVIDUALIZED OFFERS USING THE MACHINE LEARNING AND ANALYTICS MODEL INCLUDES (I) SELECTING A SET OF ATTRIBUTES FOR THE TARGET SEGMENT BASED ON USER SELECTION FROM ONE OR MORE ATTRIBUTES ASSOCIATED WITH THE MEMBER DATA BY A USER. THE SET OF ATTRIBUTES INCLUDES A SET OF STATIC ATTRIBUTES AND A SET OF MATHEMATICAL ATTRIBUTES, (II) GENERATING THE INDIVIDUALIZED OFFER FOR EACH MEMBER ID IN THE TARGET SEGMENT BY APPLYING THE SET OF STATIC ATTRIBUTES AND THE SET OF MATHEMATICAL ATTRIBUTES ON THE BASE OFFER FOR THE ONE OR MORE MEMBER IDS. THE SET OF MATHEMATICAL ATTRIBUTES IS PERFORMED ON THE NUMERICAL PART OR THE LOGICAL PART OF THE BASE OFFER. THE SET OF STATIC ATTRIBUTES PERFORMS ON THE ONE OR MORE MEMBER IDS TO MATCH THE SET OF STATIC ATTRIBUTES. (III) GENERATING INDIVIDUALIZED SEGMENTS FOR EACH MEMBER ID BY MATCHING BASED ON PRODUCT ATTRIBUTES MATCHING WITH THE SET OF STATIC ATTRIBUTES OF EACH MEMBER ID USING THE RULE GENERATED FOR THE TARGET SEGMENT, THEREBY AUTOMATICALLY EXECUTING THE INDIVIDUALIZED OFFERS FOR EACH MEMBER ID IN THE TARGET SEGMENT

SYSTEM AND METHOD OF INDIVIDUALIZED OFFER EXECUTION AT A SCALE

BACKGROUND

Technical Field

The embodiments herein generally relate to offer management for enterprises on large data sets, more particularly, to a system and method of automatically executing individualized offers for each member identity (ID) in a target segment of members.

Description of the Related Art

As the global market is becoming far-reaching in terms of customer engagement. Enterprises are looking towards an era of increased understanding of customer behavior and using those insights to step up their customer engagement. Enterprises are using their first-party data to leverage and create value through highly customized offers directed toward existing and potential customers. There have been attempts to make customer data accessible, easy, and seamless to create customized offers as a strategic initiative for customer engagement for enterprises ranging from airlines, and hospitality to banking and retail. Customization of offers is used to create a unique customer experience. The way to achieve specialized customer experiences currently is by using data segmentation and combining it with a customer profile. The customer profile may include information such as age, gender, location, etc. The existing system implemented segment upon customer IDs cannot give truly tailored offers to the customer.

There have been Artificial intelligence-powered offers and product recommendations in the market. Artificial intelligence is used to forecast the expected behavior or spending habits of the customer. There has been the use of data from customer profiles and history to recommend new products and services to the customer. In AI-based systems, the conversion rate of customized product recommendations is higher, but it leaves much to desire in terms of customer engagement. In existing systems, no new products or offers are created specifically to meet the needs of the customer.

In existing systems, the product or service is recommended from an existing list of products and services library. The same product or service may be recommended to multiple customers under the same segment. Also, no new offers are created, but the same pre-generated offers are targeted toward multiple customers with a specific customer profile. So, even though there is an attempt to customize the offers for the customers, these offers are already created, and hence may only arbitrarily match the specific needs of the targeted customers. In these existing systems, an individual is not technically recognized by the data systems, as each segment typically has multiple customer IDs. So, even though there has been a movement towards knowing the customer in the industry, the existing systems are unable to identify and cater to the unique needs of the customers on large-scale data. Thus, it is difficult for enterprises to create truly customized offers.

Therefore, there remains a need for a system and method for identifying the needs and wants of the customers and creating specialized offers for individuals from large-scale data of the enterprises in an efficient manner.

SUMMARY

In view of the foregoing, there is provided a processor-implemented method of automatically executing an individualized offer for each member identity (ID) in one or more target segments. The method includes integrating a machine learning and analytics model to ingest member data and third-party data of each member ID to identify a target segment for each member ID from one or more target segments. The method includes selecting a base offer from one or more base offers for the target segment by the machine learning and analytics model. The the target segment includes one or more member IDs associated with one or more members in the target segment. The base offer includes a numerical part and a logical part. The method includes generating a rule for the base offer associated with the target segment from a rules database. The method includes dynamically evaluating the individualized offer on the rule that is generated for the base offer associated with the target segment in real-time while processing transactional data of each member ID. The dynamic evaluation of the individualized offers using the machine learning and analytics model includes selecting a set of attributes for the target segment from one or more attributes associated with the member data by a member. The set of attributes includes a set of static attributes and a set of mathematical attributes. The dynamic evaluation of the individualized offers includes generating the individualized offer for each member ID in the target segment applying the set of static attributes and the set of mathematical attributes on the base offer for the one or more member IDs. The set of mathematical attributes is performed on the numerical part or the logical part of the base offer. The set of static attributes performs on the one or more member IDs to match the set of static attributes. The dynamic evaluation of the individualized offers further includes generating individualized segments for each member ID by matching based on product attributes matching with the set of static attributes of each member ID using the rule generated for the target segment, and automatically executing the individualized offers for each member ID in the target segment.

In some embodiments, the set of mathematical attributes includes a reward rate, which operates on the rule of the base offer. In some embodiments, the individualized offer for each member ID in the target segment is generated based on the set of static attributes associated with each member ID.

In some embodiments, the set of mathematical attributes includes an offer start date or an offer end date, which operates on the rule of the base offer. In some embodiments, the individualized offer pertaining to the offer start date or the offer end date for each member ID in the target segment is generated based on the set of static attributes associated with each member ID.

In some embodiments, the set of mathematical attributes includes a qualifying product category or a qualifying product, which operates on the rule of the base offer. In some embodiments, the individualized offer pertaining to the qualifying product category, or the qualifying product for each member ID in the target segment is generated based on the set of static attributes associated with each member ID.

In some embodiments, the set of mathematical attributes includes a qualifying flight route or a qualifying destination, which operates on the rule of the base offer. In some embodiments, the individualized offer pertaining to the qualifying flight route or the qualifying destination for each member ID in the target segment is generated based on the set of static attributes associated with each member ID.

In some embodiments, the set of mathematical attributes is generated based on a business need in real-time by an input of a member or the machine learning and analytics model, which operates on the rule of the base offer.

In some embodiments, the set of mathematical attributes includes at least one of (a) a reward rate, and (b) a spending objective. In some embodiments, the set of static attributes includes a product category or a product sub-category.

In some embodiments, the base offer is divided into the individualized offer at a unique value proposition to each member ID in the target segment using the machine learning and analytics model. The machine learning and analytics model is trained by correlating historical base offers with historical member IDs, and historical unique value propositions.

In some embodiments, the target segments is created in real-time based on a requirement of at least one member ID using the machine learning and analytics model. The machine learning and analytics model is trained by correlating historical target segments with historical member IDs, historical member data, and historical user requirements.

In some embodiments, the member data and the third-party data include at least one predetermined information of personal action performed on the user device, transaction data performed on the user device, and an online action performed on one or more social media in the user device.

In some embodiments, the machine learning and analytics model identifies the target segment for the one or more member IDs from the one or more target segments in real-time by ingesting the member data and the third-party data in real-time.

In some embodiments, the processor is configured to calculate differential offers for each member ID in the target segment based on a unique combination of the set of static attributes and the set of mathematical attributes along with the transactional data and the member data.

In one aspect, a system for automatically generating individualized offers for each member ID in a plurality of target segments is provided. The system includes a memory that stores a set of instructions and a processor that is configured to execute the set of instructions, which when executed by the processor causes one or more functions of the system. The system includes an individualized offer execution system. The individualized offer execution system includes (i) an offer personalizing module for generating a base offer for the target segment, (ii) the rule engine for generating one or more rules from a rule database that relates to a set of conditions followed by action, (iii) an individualized segment generating module to generate individualized segments for each member ID, and (iv) a machine learning and analytics model to ingest member data and third-party data of each member ID to identify the target segment for each member ID from one or more target segments. The system performs to (i) select the base offer from one or more base offers for the target segment by the machine learning and analytics model (108). The target segment includes including one or more member IDs associated with the one or more members in the target segment. The base offer includes a numerical part and a logical part, (ii) generates a rule for the base offer associated with the target segment from the rules database, and (iii) dynamically evaluates the individualized offer for each member ID in the target segment (406) based on the rule that is generated for the base offer associated with of target segment (406) in real-time while processing the transactional data of each member ID. The dynamic evaluation of the individualized offers includes selecting a set of attributes for the target segment from one or more attributes associated with the member data by a member. The set of attributes includes a set of static attributes and a set of mathematical attributes. The dynamic evaluation of the individualized offers includes generate the individualized offer for each member ID in the target segment by applying the set of static attributes and the set of mathematical attributes on the base offer for the one or more member IDs. The set of mathematical attributes is performed on the numerical part or the logical part of the base offer. The set of static attributes performs on the one or more member IDs to match the set of static attributes. The dynamic evaluation of the individualized offers includes generating the individualized segments for each member ID by matching based on product attributes matching with the set of static attributes of each member ID using the rule generated for the target segment, and automatically executing the individualized offers for each member ID in the target segment.

In the method and the system, the offer rule need not be generated for each member in the target segment, at the same time, a high degree of customization is made possible at the level of an individual member in a large data set of thousands and millions of member IDs based on the member or user selected attributes. The system needed only one individualized offer to accommodate all the different variations. This eliminates the need for repetitive offer creation and simplifies segmentation, saving time and effort for business users. The system enables the management of diverse offers more efficiently. The business users no longer have to go through the repetitive task of creating multiple offers for each variation which is time-consuming. The system allows loyalty programs to greatly reduce the number of offers required. This reduction in offer count has a significant impact on the system performance optimization. The business users can focus on optimizing and fine-tuning a single offer rather than juggling multiple offers. Regardless of the specific variation, customers will encounter the same offer, maintaining a cohesive and unified branding and messaging strategy. With a smaller rules base to evaluate, the system can quickly determine the appropriate actions to take, leading to improved processing time. Managing a smaller rules base is easier and less time-consuming. The smaller rules base means that the loyalty program's system can process transactions more efficiently. The business users can update and modify rules more efficiently, resulting in faster implementation of changes and improvements. BITs are the transactions processed within the loyalty program, such as earning or redeeming rewards. With the smaller rules base, the system can process these transactions more efficiently. The reduced number of rules to evaluate speeds up the processing time, enabling faster responses to customer transactions. the system can evaluate and deliver offers more quickly, resulting in reduced latency. Customers receive offers in a timelier manner, enhancing their experience and increasing the likelihood of engagement.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 illustrates exemplary attributes and values associated with individualized offers according to some embodiments herein;

FIGS. 7A-7C illustrate exemplary data model representations for individualized offers in a view of a user interface, according to some embodiments herein;

FIGS. 8A-8B are flow diagrams that illustrate a method for executing an individualized offer for each member ID in a target segment.

DETAILED DESCRIPTION OF PREFERRED EMBODIMENTS

Figure 1:
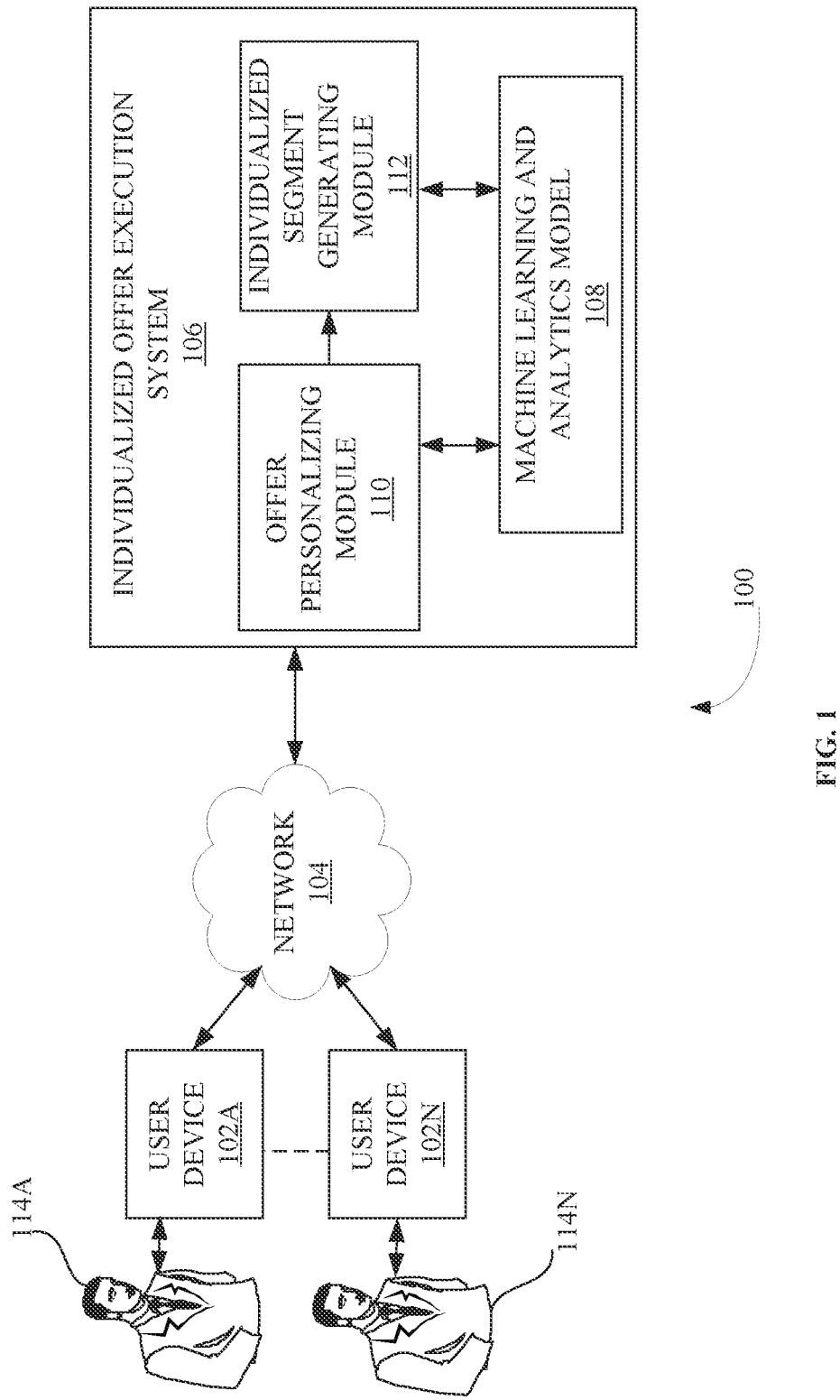
FIG. 1 is a block diagram of a system for executing an individualized offer for each member ID in a target segment, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a method of executing an individualized offer for each member ID in the target segment. Referring now to the drawings, and more particularly to FIGS. 1 to 9, where similar reference characters denote corresponding features consistently throughout the figures, there are shown preferred embodiments.

Definitions

Offer: present or make available something tangible that may include financial or other benefits and may include products and services.

Personalization: Tailoring an offer to accommodate a specific segment of members.

Individualization: Creating a customization of an offer for an individual based on the unique behavior of the individual.

Propensity: Frequency of an incidence or an event.

Product matching: finding the same or similar products against a target list of known products.

Product attributes matching: Attributes may vary but can apply to multiple products and product categories. For example, attributes may include weight, name, product ID, color, size, price, etc.

FIG. 1 illustrates a block diagram 100 of a system for executing an individualized offer for each member ID in the target segment according to some embodiments herein. The system includes one or more user devices 102A-N, a network 104, and an individualized offer execution system 106. The individualized offer execution system 106 includes an offer personalizing module 110, an individualized segment generating module 112, and a machine learning model and analytics model 108. The one or more user devices 102A-N are communicatively connected with the individualized offer execution system 106 through the network 104. The individualized offer execution system 106 may include a rules engine that generates one or more rules from a rules database. In some embodiments, the network 104 is a wired network or a wireless network. The network 104 may be the internet. The individualized offer execution system 106 receives inputs from the one or more user devices 102A-N associated with one or more members 114A-N. The input may be third-party data and member data given by the one or more members 114A-N. In some embodiments, the one or more members 114A-N are one or more users or one or more customers of a loyalty program. In some embodiments, the third-party data includes a combination of behavior, influence, and transaction score (BIT) of the one or more members 114A-N. In some embodiments, the behavior is different pre-defined actions performed by a member 114A. The influence may be calculated by the social media share, references, and new member enrolment as the influence of a member ID. In some embodiments, the transaction score is calculated by the actual invoice amount paid for by the member 114A. For example, invoice amount, time of the visit, email, date of birth, age, frequently viewed and purchased products, etc. The member data obtained from the one or more members 114A-N at the time of enrolling.

The one or more user devices 102A-N may be but are not limited to, a tablet, a laptop, a computer device, a customized input device, or a mobile phone. The individualized offer execution system 106 may be a server or a cloud. The machine learning model and analytics model 108 generate predictions for behavior of the one or more members 114A-N.

The machine learning model and analytics model 108 ingest the member data and the third-party data of each member ID to identify the target segment for each member ID from one or more target segments. The target segment includes one or more member IDs associated with the one or more members 114A-N. The machine learning model and analytics model 108 may be employed to generate insights and predictions based on the influence, the behavioral data, and the transactional data (BIT) of the member data of the one or more user devices 102A-N. In some embodiments, the predictions include individual behavior regarding retention with a brand or the loyalty program.

The offer personalizing module 110 selects a base offer from one or more base offers for the target segment. The target segment includes the one or more member IDs associated with the one or more members 114A-N. The offer personalizing module 110 generates the base offer for the target segment using the machine learning model and analytics model 108. The offer personalizing module 110 generates a rule for the base offer associated with the target segment from a rules database. The rules are associated with at least one action performed on the one or more member data associated with the one or more member IDs. The one or more member data includes a user account associated with the one or more members 114A-N of the one or more user devices 102A-N.

In some embodiments, the at least one action on the one or more member data includes one or more (i) attributing a value to an action performed at each member user account based on one or more rules from the rules database, (ii) attributing a value to a transaction performed at each member user account based on the one or more rules from the rules database, (iii) updating the one or more member data based on at least one of the action or the attributed transaction value in the user accounts of the one or more members 114A-N, (iv) activating communication with at least one user device 102A associated with the member user account among the one or more user devices 102A-N according to the at least one rule from the one or more rules, or (v) making a transaction on the at least user device 102A.

In some embodiments, the user accounts of the one or more members 114A-N include at least one (i) predetermined personal information (ii) a bank transaction performed at the user device 102A-N, and (iii) an online action performed at the user device 102A-N on one or more social media platforms. In some embodiments, the transactions include a purchase transaction, flight transaction, etc. In some embodiments, the predetermined personal information includes hotel transactions or booking, referral via one or more social media platforms for transactions, referral via the one or more social media platforms for member enrolment, payment with a co-branded credit/debit card, flying business class, etc. The online action includes online check-ins in hotels, restaurants, airlines, and social media activity that includes liking, upvoting, retweeting, etc., promotional activities, and sharing purchase information on the one or more social media platforms, etc. In some embodiments, the predetermined personal information of the user accounts of the one or more members 114A-N is used to determine various conditions for setting rules.

The individualized segment-generating module 112 receives a set of attributes for the target segment from one or more attributes associated with the member data by the member 114A. The set of attributes includes a set of static attributes and a set of mathematical attributes.

The individualized segment-generating module 112 applies the set of static attributes and the set of mathematical attributes on the base offer for the one or more member IDs to generate individual offers for each member ID in the target segment. The set of mathematical attributes is performed on the numerical part or the logical part of the base offer that generates individual offers for each member ID in the target segment. The set of static attributes selects the one or more member IDs that match the set of static attributes that generate the individual offer for each member ID in the target segment. The individualized segment generating module 112 generates individualized segments for each member ID by matching based on product attributes matching with the set of static attributes of each member ID using the rule generated for the target segment. The individual offer calculating module 216 calculates individualized offers for each member ID in the target segment based on a unique combination of the set of static attributes and the set of mathematical attributes along with the transactional data and the member data. The individualized offer execution system 106 automatically executes the individualized offers for each member ID in the target segment.

Figure 2:
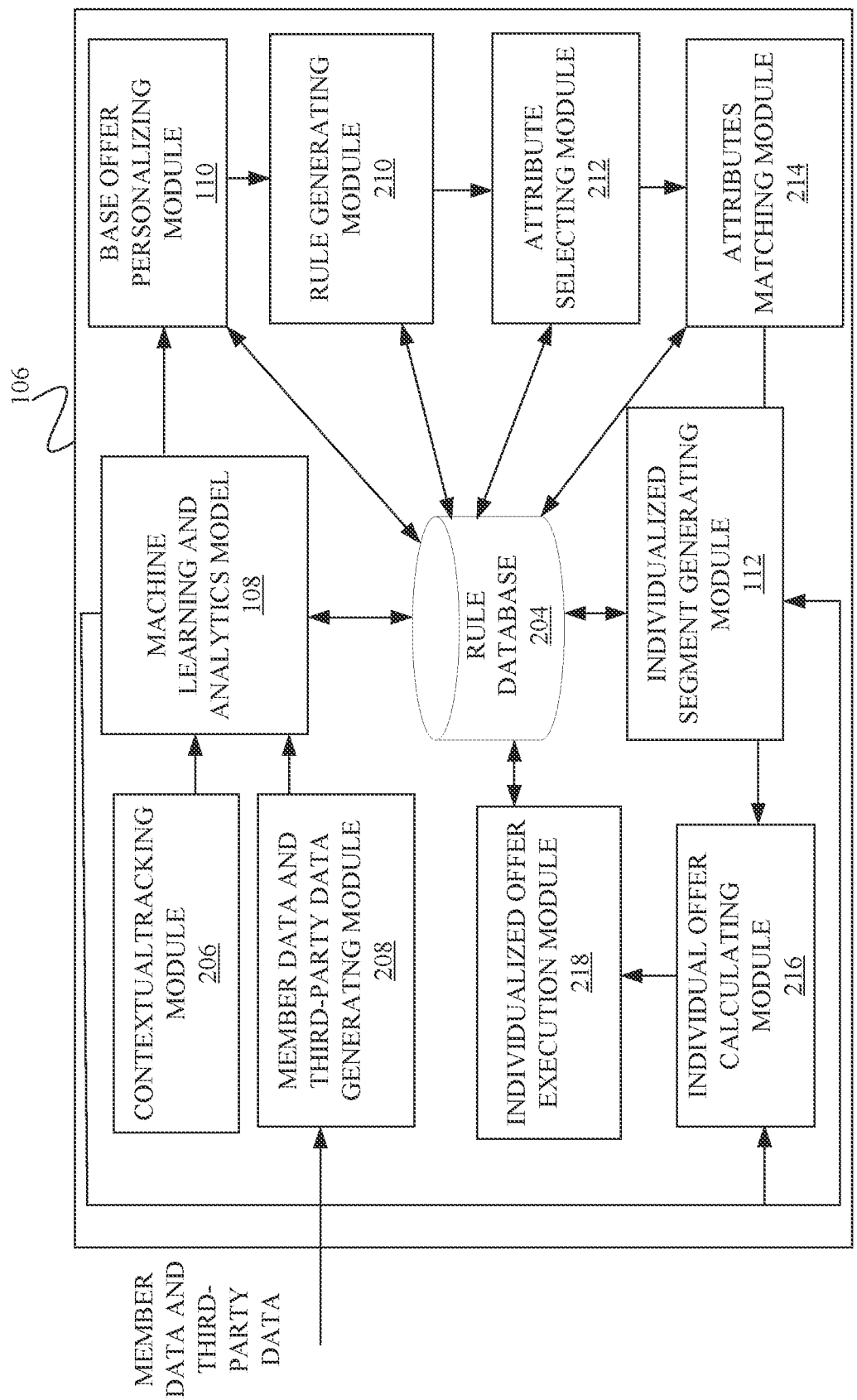
FIG. 2 is an exploded view of an individualized offer execution system of FIG. 1, according to some embodiments herein.

FIG. 2 is an exploded view 200 of the individualized offer execution system 106 according to some embodiments herein. The individualized offer execution system 106 includes a rule database 204, a contextual tracking module 206, a member data and third-party data generating module 208, a machine learning and analytics model 108, a base offer personalizing module 110, an individualized segment generating module 112, a rule generating module 210, an attribute selecting module 212, attributes matching module 214, an individual offer calculating module 216, and an individualized offer execution module 218. The rules database 204 may include a rules engine that stores rules. The rules are a set of conditions followed by a set of actions. The rules represent the logic of the individualized offer execution module 218.

The contextual tracking module 206 tracks behavior of one or more members 114A-N associated with one or more member IDs based on a set of contexts, or name of business, a location, or any combination thereof, for which the rule is applicable. For example, Forum mall, Hyderabad for the context of electronics shopping, etc. On each member ID, one or more attributes are added to member data based on the behavior of the one or more members 114A-N associated with the one or more member IDs. The one or more member IDs are categorized by a set of attributes.

The member data and third-party data generating module 208 generates the member data and the third-party data from the one or more members 114A-N and third parties, for example, the third-party data is generated from Application Programming Interface (APIs) through websites, etc. The member data includes data obtained from the one or more members 114A-N at the time of enrolling. The third-party data may include a combination of behavior, influence, and transaction score (BIT) of the one or more members 114A-N. The behavior may be different pre-defined actions performed by a member 114A. The influence may be calculated by the social media share, references, and new member enrolment as the influence of a member ID. The transaction score may be calculated by the actual invoice amount paid for by the member 114A. For example, invoice amount, time of the visit, email, date of birth, age, frequently viewed and purchased products, etc. The contextual tracking module 206 and the member data and the third-party data generating module 208 provide the member data and the third-party data to the machine learning model and analytics model 108 as input.

The machine learning and analytics model 108 ingests the member data and the third-party data of each member ID to identify a target segment for each member ID from one or more target segments. The target segment includes the one or more member IDs associated with the one or more members 114A-N.

The base offer personalizing module 110 selects the base offer from one or more base offers for the target segment using the machine learning and analytics model 108. The rule generating module 210 generates a rule for the base offer of the target segment as per the set of conditions in real-time by personalizing one or more rules from a rules database to the one or more member IDs or a particular context. For example, a group of high spenders is defined by more than 5000 INR spending per visit. The base offer includes a numerical part and a logical part. In some embodiments, the base offer is divided into the individualized offer at a unique value proposition to each member ID in the target segment.

The attribute selecting module 212 selects a set of attributes for the target segment based on user selection from the one or more attributes associated with member data. The set of attributes includes a set of static attributes and a set of mathematical attributes. For example, the selected attributes are spent objective, reward rate, and product category. The one or more attributes are tracked from the member data and the third part data that are received at the member data and third-party data generating module 208.

The attributes matching module 214 applies the set of static attributes and the set of mathematical attributes for the one or more member IDs to generate the individualized offer for each member ID in the target segment. The set of mathematical attributes is performed on the numerical part or the logical part of the base offer that generates offers for each member ID in the target segment. The set of static attributes selects the one or more member IDs that match the set of static attributes.

The individualized segment generating module 112 generates individualized segments for each member ID by matching based on product attribute matching with the set of static attributes of each member ID and the rule generated for the base offer of the target segment using the machine learning model and analytics model 108.

The individual offer calculating module 216 calculates differential offers for each member ID in the target segment based on a unique combination of the set of static attributes and the set of mathematical attributes along with the transactional data and the member data by calculating different thresholds and conditions for each member ID. For example, the product category of the spend objective should match the reward rate. The machine learning and analytical model 108 recommends products from a product list from either a machine learning model or historical data based on the result of the individual offer calculating module 216.

The individualized offer execution module 218 automatically executes the individualized offers for each member ID in the target segment.

In some embodiments, the machine learning model and analytics model 108 predict a propensity of each member's behaviour regarding the individualized offer. The individualized offer may include a static or contextual part and a mathematical part. The individualized offer is automated using the set of static attributes and the set of mathematical attributes as needed for the target segment.

In some embodiments, the individualized offer execution module 218 executes the individualized offers directed towards each member ID based on an output from the machine learning and analytics model 108. For example, the individualized offers would be specific to the member based on spending habits, engagement level, taking an action, etc. In the invoice, if category-wise spent is equal to segment-level spending objective. Then the reward rate of the target segment is calculated as amount/quantity.

Figure 3A:
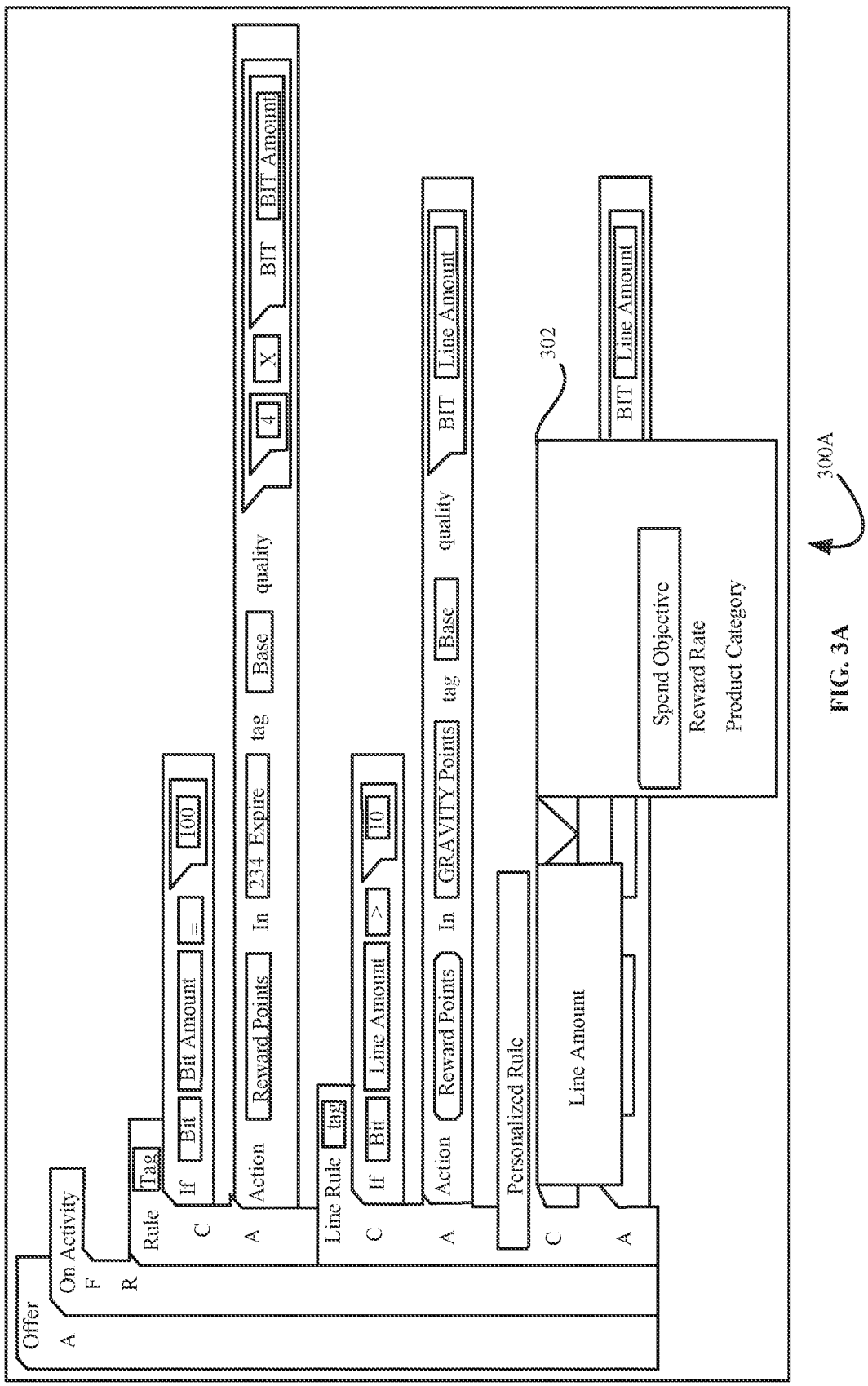
FIGS. 3A-3B illustrate exemplary views of a user interface for selecting a set of attributes from one or more attributes according to some embodiments herein.
Figure 3B:
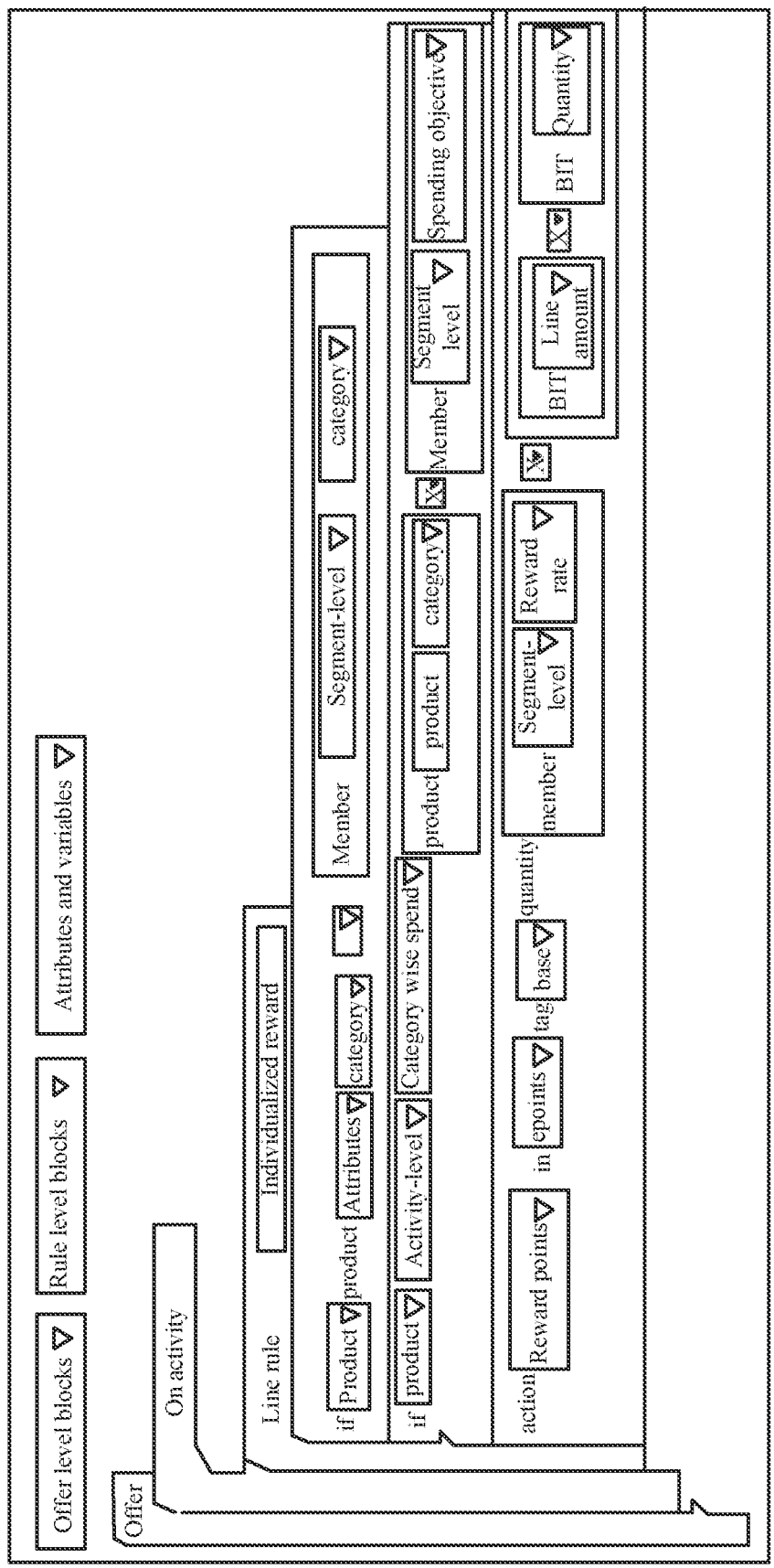

FIGS. 3A-3B illustrates exemplary views 300A and 300B of a user interface for selecting a set of attributes from one or more attributes according to some embodiments herein. The one or more member 114A-N selects the set of attributes from the one or more attributes associated with the member data in the target segment. The exemplary view 300A of the user interface depicts the one or more attributes. The one or more attributes are tracked from member data and third-party data that are received at a member data and third-party data generating module 208, and one or more rules are generated from a rules database to match the target segment.

The exemplary view 300B of the user depicts an element of the reward rate, spend objective, category, and quantity for selecting values for the set of attributes 302.

The set of attributes 302 may include a set of static attributes and a set of mathematical attributes. For example, the set of static attributes may include age bracket, location, spend thresholds, behavior parameters, etc. The set of mathematical attributes may include the reward rate, the spend objective, the category etc. The mathematical attributes perform a mathematical operation on the member data for relevant attribute values and arrive at a differential outcome for each member ID when the set of attributes is selected. For example, member A may be rewarded at a different reward rate than member B based on their average expenditure, and the offer would reflect an invoice amount of the user accordingly when purchasing the selected product category. An individual offer calculating system 216 generates differential offers for one or more members 114A-N who spend different amounts and have different levels of social influence and behavior regarding retention with a different brand or a loyalty program, as all of these are examples of attributes that the target segment is categorized.

Figure 4A:
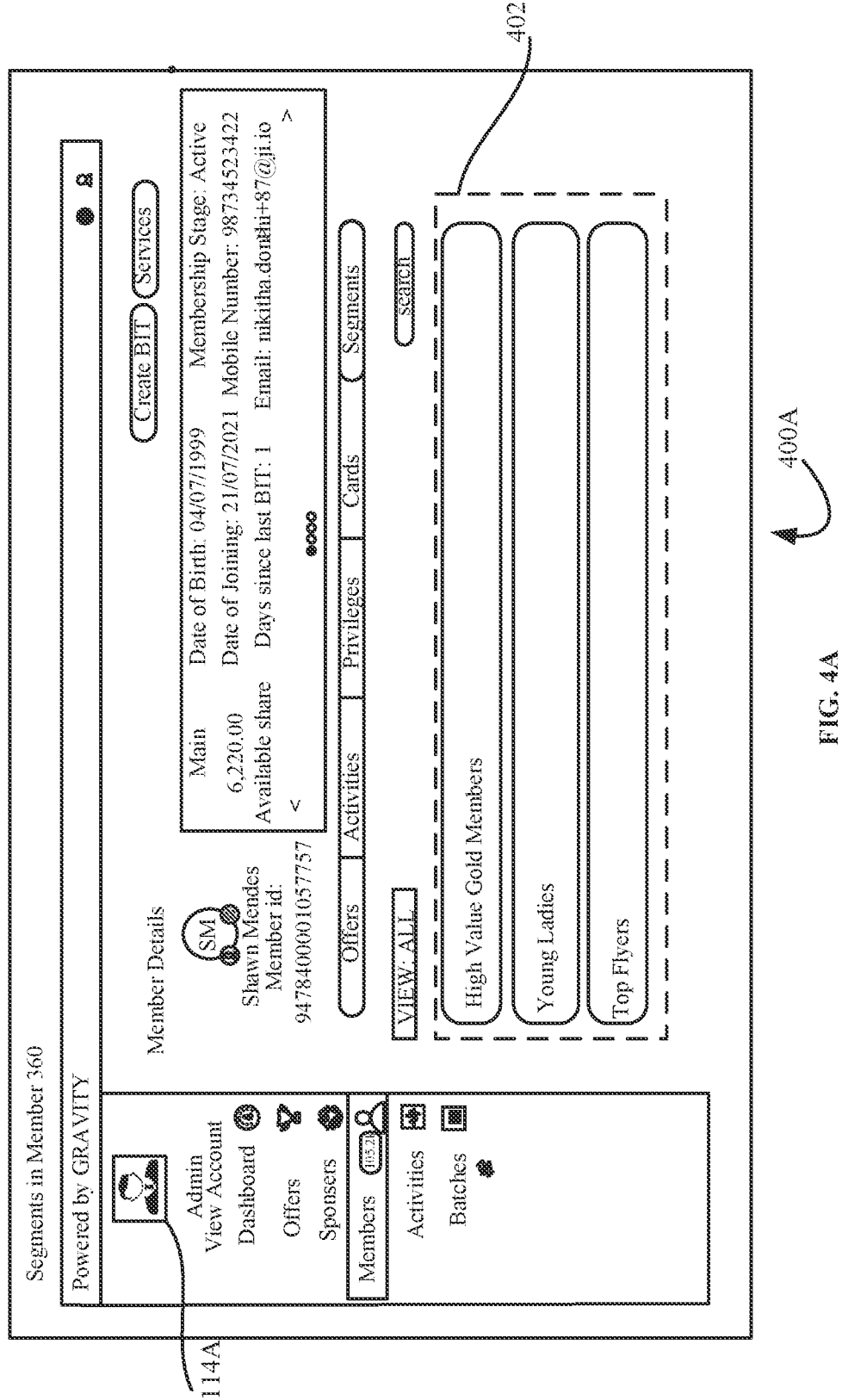
FIGS. 4A-4B illustrate exemplary views of user interface of segment selection and a set of attributes selected for a target segment according to some embodiments herein.
Figure 4B:
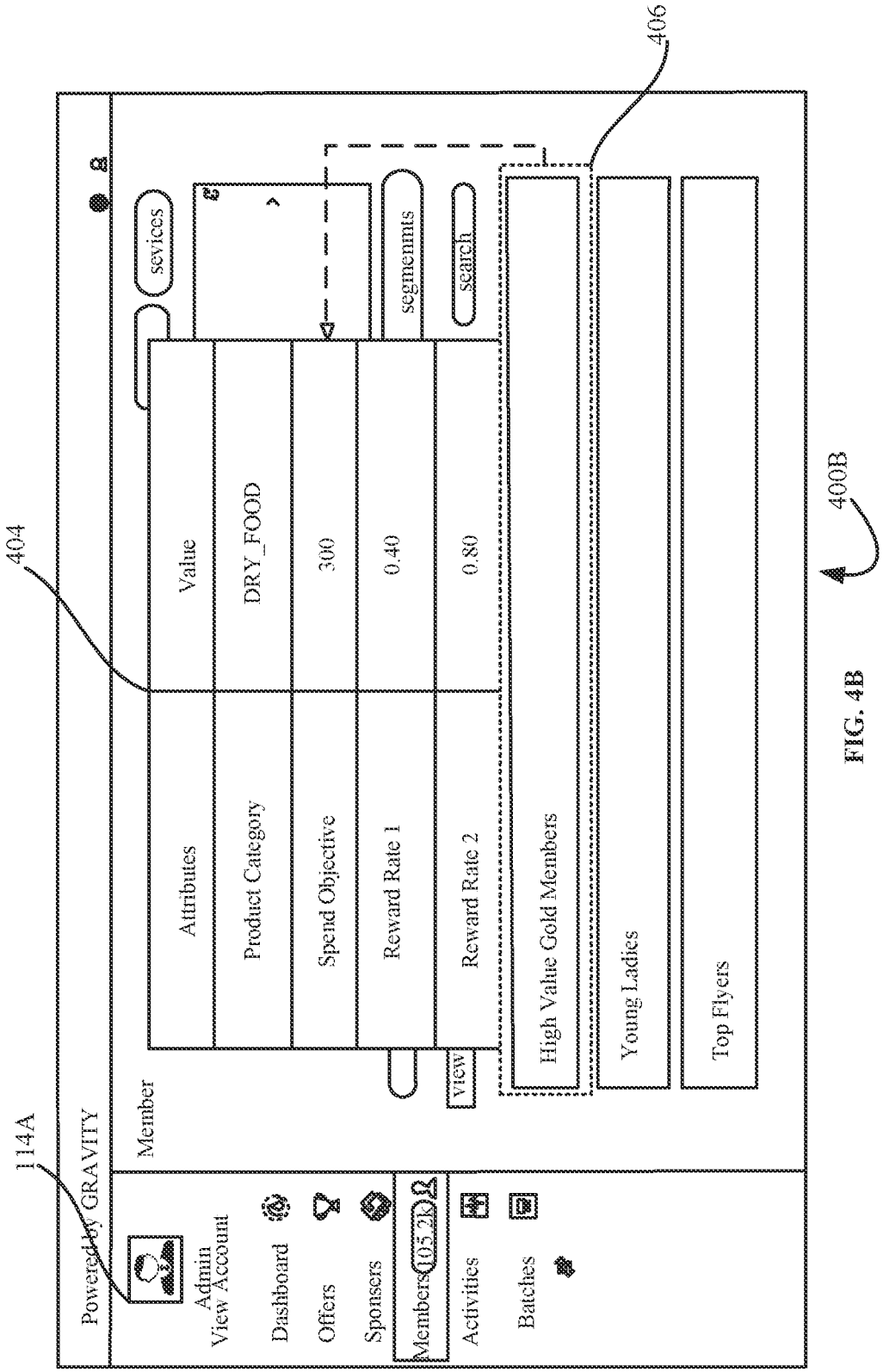

FIGS. 4A-4B illustrates an exemplary views 400A and 400B of user interface for segment selection and attribute selection for a target segment, according to some embodiments herein. A machine learning or analytics model 108 identifies the target segment from one or more target segments 402 for each member ID by ingesting member data and third-party data of each member ID. The exemplary view of a user interface 400A depicts the one or more target segments 402 illustrated are 'High value gold members', 'young ladies', and 'top flyers' as shown in FIG. 4A. In some embodiments, the machine learning and the analytics model 108 identifies the target segment for each member ID by segmenting the one or more member IDs into one or more micro-segments using a set of attributes 404 that includes a set of values. Each micro-segment may include the one or more member IDs. In some embodiments, the one or more segments may be pre-configured in each member ID or the one or more segments may be created based on a business requirement of the member in each member ID.

The member 114A may select the set of attributes 404 from one or more attributes associated with the member data in the target segment. The exemplary view 400B of the user interface depicts the set of attributes 404 selected for the target segment 406 by the member 114A from the one or more set of attributes.

The exemplary view 400B of the user interface depicts the set of attributes 404 and a value of the set of attributes 404 associated with the segment 404 is selected by the member 114A. For example, the set of attributes 404 is spent objective is 300, reward rate 1 is 0.40, reward rate 2 is 0.80, and product category is 'dry food' are associated with the target segment 406 of 'High-value gold members' as the user falls into the target segment of the 'High-value gold members' among other segments.

The set of mathematical attributes may include a reward rate, which operates on a rule of a base offer, and the set of static attributes associated with a member ID to generate the individualized offer for each member ID in a target segment 406.

For example, a member ID that belongs to a gold tier, can be programmed to rewarded at 10% extra reward rate and a member ID which belongs to a silver tier, can be programmed to be rewarded at 5% extra reward rate in the same offer, without the need to set separate offers for both gold and silver tier members.

The set of mathematical attributes may include an offer start date or an offer end date, which operates on the rule of the base offer, and the set of static attributes associated with the member ID to generate the individualized offer that pertaining to the offer start date or the offer end date for each member ID in the target segment. For example, airline tickets bought during a certain duration between an offer start date or an offer end date as prescribed by an airline business may be rewarded differently. For example, all flight tickets booked from Jan. 1 2023 to Feb. 2 2023 may have a different offer generated than the flight tickets booked between 3 Feb. 2023 to 4 Mar. 2023.

The set of mathematical attributes may include a qualifying product category or a qualifying product, which operates on the rule of the base offer, and the state of static attributes associated with the member ID to generate the individualized offer pertaining to the include a qualifying product category or the qualifying product for each member ID in the target segment. each member ID can be rewarded with a unique product based on a prediction of the machine learning model and analytics model 108.

For example, when setting offers for a supermarket, a first member ID, based on their propensity of buying, is rewarded for the product category of fruits and vegetables, while a second member ID is rewarded for the product category of dairy products.

The set of mathematical attributes may include a qualifying flight route or a qualifying destination, which operates on the base offer rule and the state of static attributes associated with the member ID to generate the individualized offer pertaining to the include qualifying flight route or the qualifying destination for each member ID in the target segment. For example, a first member ID, a frequent business class traveller between Mumbai and San Francisco, is rewarded air miles on this route, while the second member ID, an occasional business class traveller on a route Madrid to Dubai, is rewarded air miles on this route. Also, the individualized offers may be further differentiated based on the frequency of flying.

In some embodiments, the system provides the flexibility to program the set of mathematical attributes and the set of static attributes based on the unique need of any business to create offers that truly make difference to the members and the businesses. Therefore, many more unique attributes can be created as per the requirement using the easy configurability of offer automation.

Figure 5:
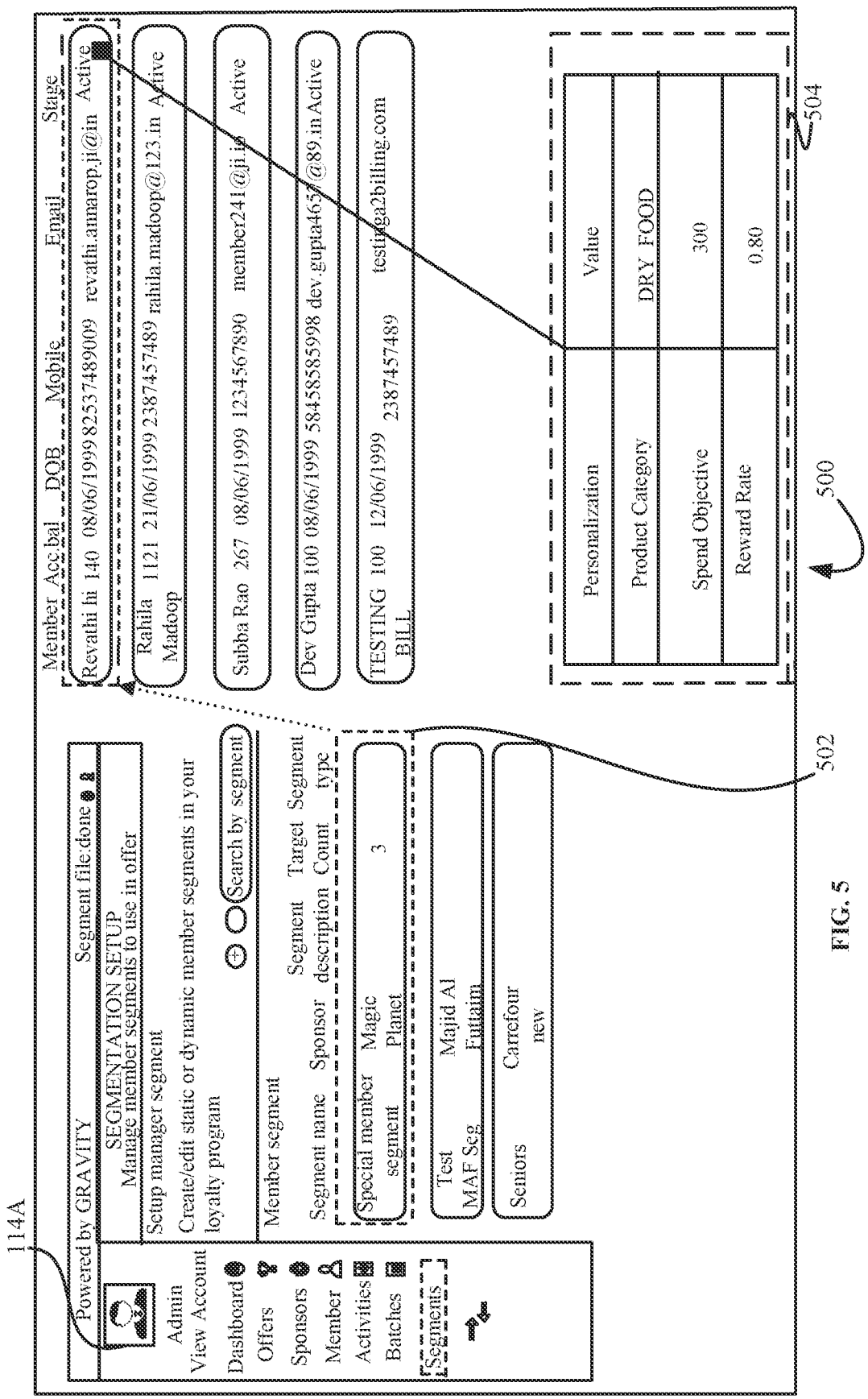
FIG. 5 illustrates an exemplary user interface view of segment representation for member ID according to some embodiments herein.

FIG. 5 illustrates an exemplary user interface view 500 of segment representation for member ID, according to some embodiments herein. The exemplary view of the user interface 500 depicts one or more segments illustrated are 'special member segment', 'Test MAF seg', and 'seniors'. The exemplary view of the user interface depicts 500 that each target segment includes one or more member IDs associated with one or more members 114A-N. For example, the target segment 502 of the 'special member segment' includes the one or more member IDs associated with one or more members 114A-N. For example, a member ID 9478400001057708 is associated with a member 'Revathi hi' and the member ID 9478400001057690 is associated with the member "rahila moodap" are fall into the 'special member segment'. The exemplary view of the user interface 500 depicts a set of attributes 504 and the value of the set of attributes 504 is selected by the member associated with the member ID in target segment 502. The set of attributes 504 is selected by 'Revathi hi', for example, a product category is 'dry food', a spend objective is 300, and a reward rate is 0.40. The individualized offers may be customized to the member ID for buying dry food, and the member ID is rewarded at the rate of 0.40*invoice amount for the dry food, once the spend objective of 300 is met for purchasing the selected product category.

Figure 6:
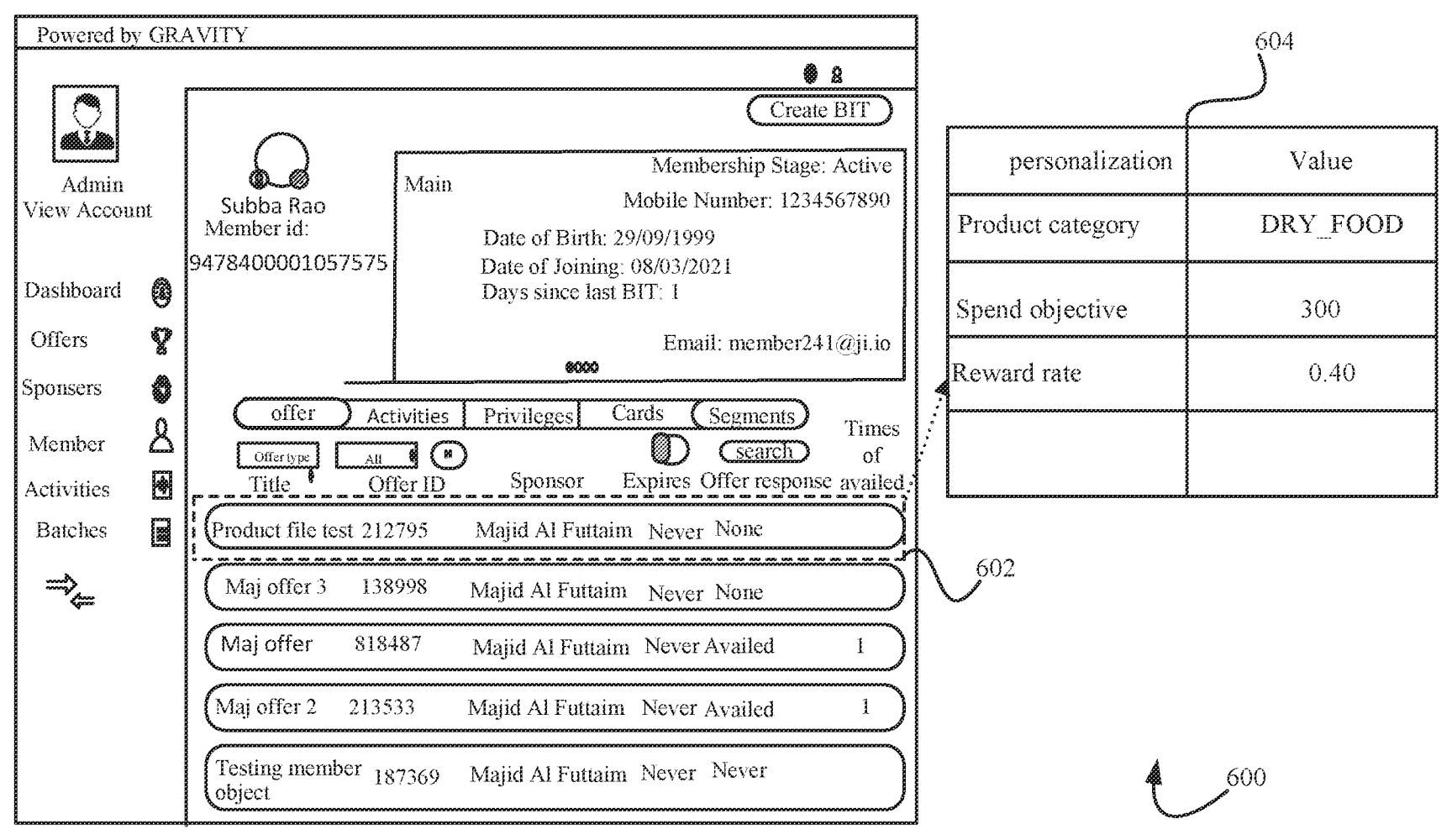

FIG. 6 illustrates an exemplary set of attributes 604 and values associated with individualized offers in a view 600 of a user interface according to some embodiments herein. The individual offer calculating module 216 calculates differential offers for each member ID in a target segment based on a unique combination of a set of static attributes and a set of mathematical attributes along with transactional data and member data. Each offer is programmed to generate differential offers to one or more member IDs in a target segment according to the values of the set of attributes 604 selected, as illustrated. For example, the selected attributes are product category, reward rate, and spend objective. The product category is 'dry food', the spend objective is 300, and the reward rate is 0.40. The product category is 'dry food'. The individual offer calculating module 216 calculates an individual offer that may be customized to member ID for buying 'dry food', and the member ID is rewarded at the rate of 0.40*invoice amount for the dry food, once the spend objective of 300 is met. The exemplary view of the user interface 600 depicts that offer type 602 is 'product file test' and an offer ID is 21279557574 for the product category 'dry food', the spend objective is 300, and the reward rate is 0.40.

Figure 7B:
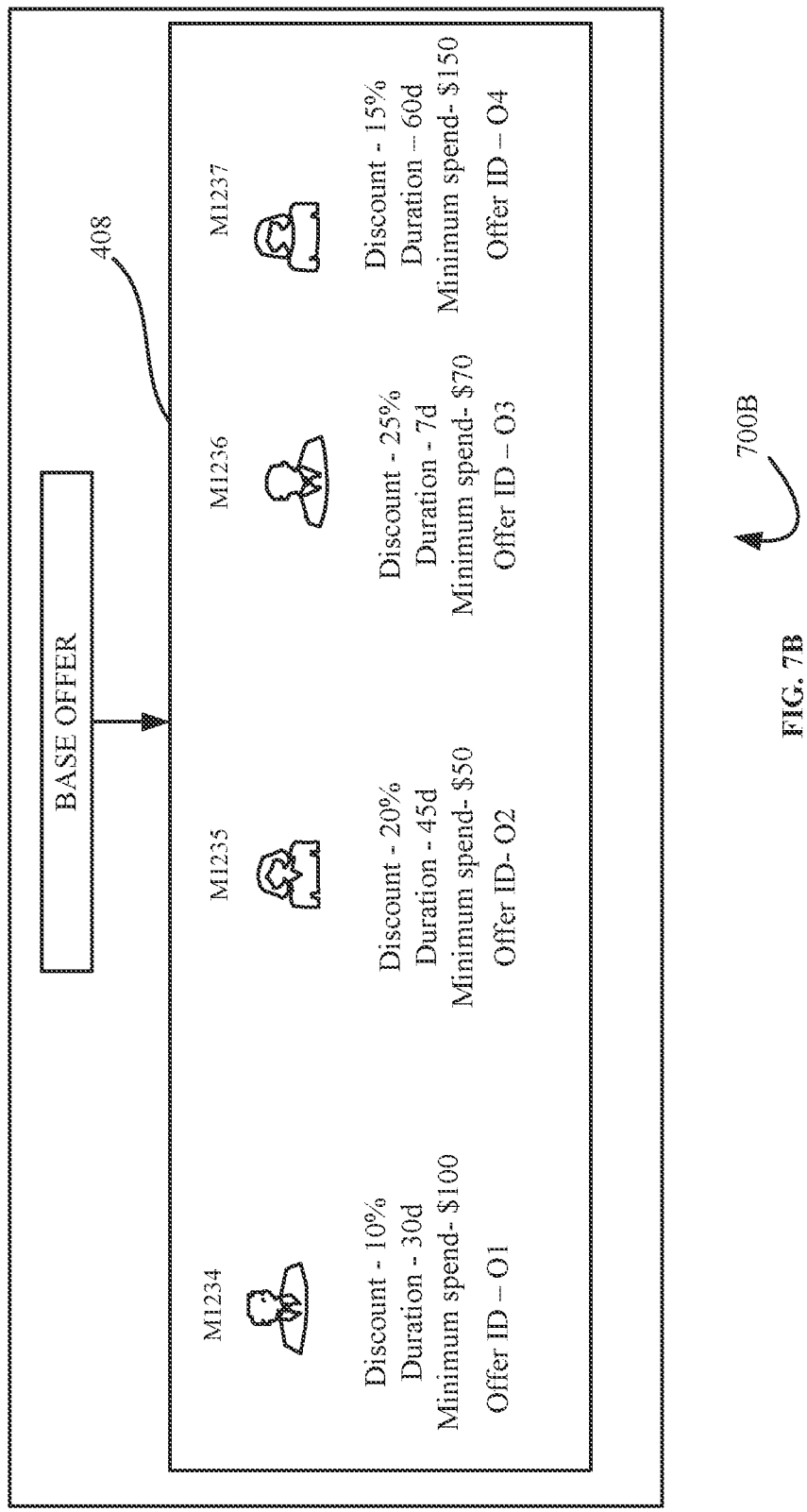

FIGS. 7A-7B illustrates exemplary data model representations for individualized offers according to some embodiments herein. The machine learning and analytics model 108 generates individualized segments for each member ID based on product attribute matching using the rule generated for base offer of a target segment. The exemplary data model illustrated each member ID is part of a segment ID and each segment ID has segment attributes. The segment attributes include a set of attributes and values associated with the set of attributes as shown in FIG. 7A. For example, the member IDs M1234, and M1235 are belong the segment ID 'vegetarian'. The machine learning model and analytics model 108 generate different individualized offers from the base offer at a unique value proposition based on different sets of attributes and values associated with the different sets of attributes for each member ID in the individualized segments. The exemplary data model illustrated the base offer is divided into the individualized offer at a unique value proposition for each member ID of the individualized segments as shown in FIG. 7B. For example, the base offer is segmented into different individualized offers O1 and O2 based on the set of attributes and related values selected by a member 114A, for example, an Offer ID 'O1' related to a discount of 10% and duration is 30 days when a minimum spend should be $100 for the segment ID 406 of 'vegetarian' and the Offer ID 'O2' related to the discount 20% c and the duration is 45 days when the minimum spend should be $50 for the segment ID 406 of 'vegetarian'. The exemplary data model illustrates different individualized sub offer IDs that represent different sub-offers for same member ID as shown in FIG. 7C. For example, the member ID M1234 has different sub offer IDs 'O1S' and 'O1A' for different sets of attributes and values associated with the different sets of attributes in the segment ID of 'vegetarian'.

Table 1: shows the time-saving and memory reduction that is accomplished with the system 100 when the system 100 generates 100 k offers.

TABLE 1

| Metric | Traditional Approach | System (Individualization offer) |
| --- | --- | --- |
| Memory Consumption for 100k Offers | 10 GB | 1 MB |
| Time Required (Man Hours) | 166 hours | 20 minutes |

In the traditional approach, generating 100 k offers would require 166 man-hours. However, the system 100 generates individualization offers in just 20 minutes that resulting in significant time savings. In the traditional approach, the 100 k offers would consume around 10 GB of the memory. But the system 100 for generating individualization offer would only require 1 MB of the memory for all 100 k offers generation resulting in a drastic reduction in memory consumption. Each individualization offer carries much less data and a data transfer is 90% less in the system 100 which means the individualization offer can be transmitted much more efficiently and quickly saving both time and bandwidth resources.

Figure 8A:
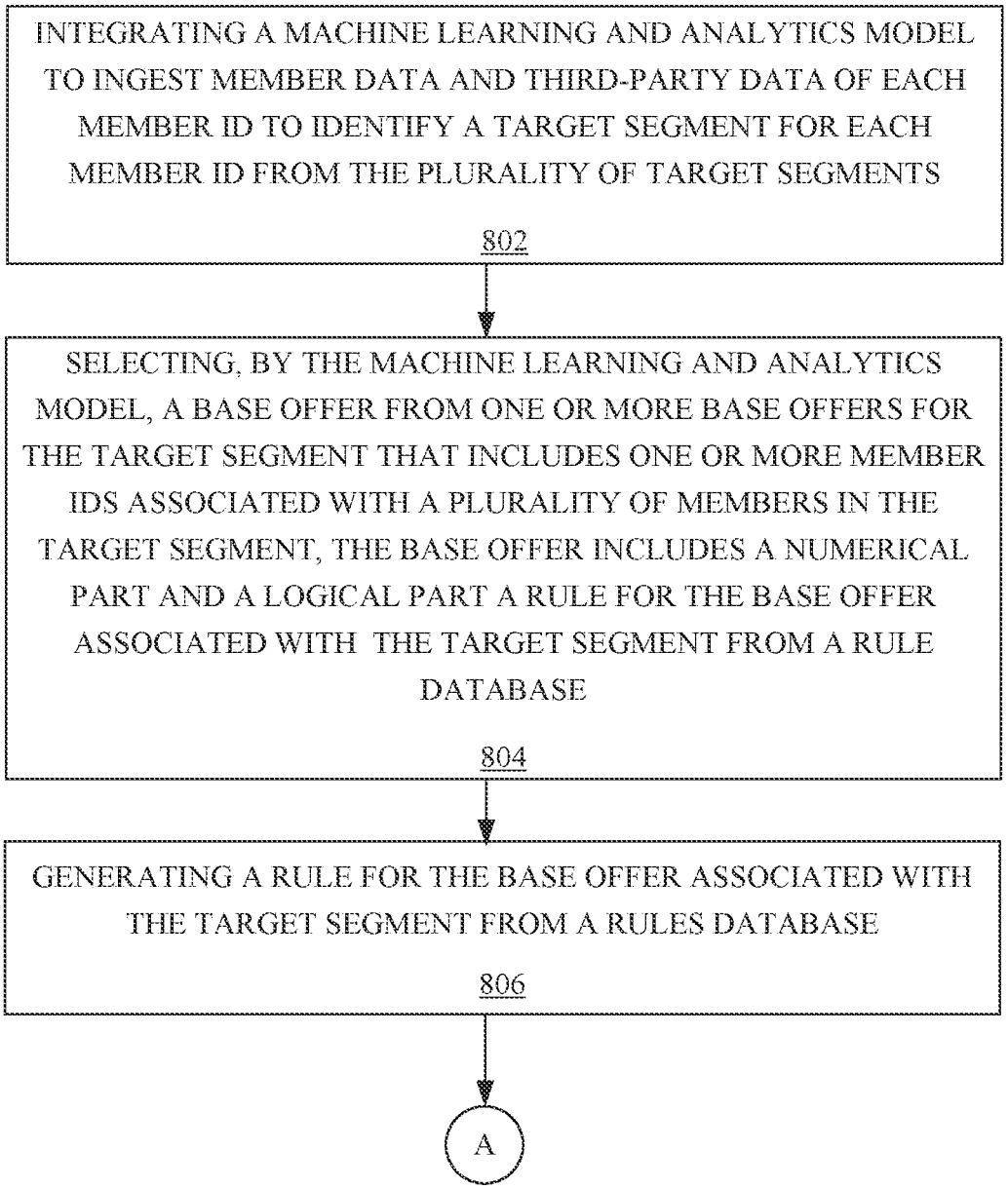

FIGS. 8A-8B are flow diagrams that illustrate a method for generating an individualized offer for each member identity (ID) in a plurality of target segments according to some embodiments herein. At step 802, the method includes, integrating a machine learning model and analytics model to ingest member data and third-party data of each member ID to identify the target segment for each member ID from one or more target segments. At step 804, the method includes, selecting, by the machine learning and analytics model, a base offer from one or more base offers for the target segment includes one or more member IDs associated with one or more members in the target segment. The base offer includes a numerical part and a logical part, At step 806, the method includes, generating a rule for the base offer associated with the target segment from a rules database, At step 808, the method includes, dynamically evaluating the individualized offer for each member ID in the target segment based on the rule that is generated for the base offer associated with the target segment in real-time while processing transactional data of each member ID, the dynamic evaluation of the individualized offers using the machine learning and analytics model includes (i) selecting a set of attributes for the target segment based on user selection from one or more attributes associated with the member data by a user. The set of attributes includes a set of static attributes and a set of mathematical attributes, (ii) generating the individualized offer for each member ID in the target segment byapplying the set of static attributes and the set of mathematical attributes on the base offer for the one or more member IDs. The set of mathematical attributes is performed on the numerical part or the logical part of the base offer. The set of static attributes performs on the one or more member IDs to match the set of static attributes, (iii) generating individualized segments for each member ID by matching based on product attributes matching with the set of static attributes of each member ID using the rule generated for the target segment, thereby automatically executing the individualized offers for each member ID in the target segment.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
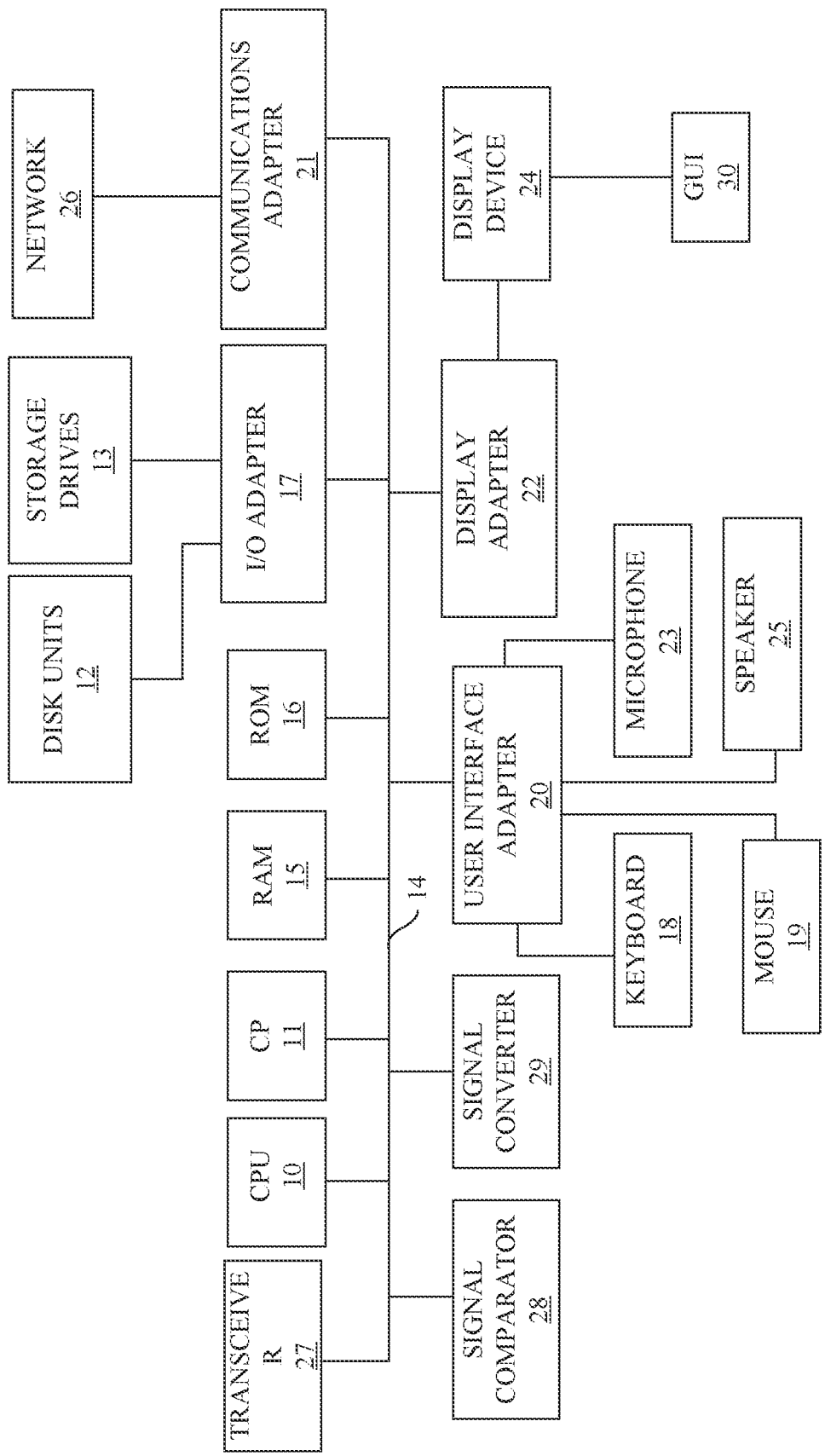
FIG. 9 illustrates a computer architecture to achieve offer individualization, according to some embodiments herein.

A representative hardware environment for practicing the embodiments herein is depicted in FIG. 9, with reference to FIGS. 1 through 8A-8B. This schematic drawing illustrates a hardware configuration of the AI model 112/a computer system/a user device 104 in accordance with the embodiments herein. The user device 104 includes at least one processing device 10 and a cryptographic processor 11. The special-purpose CPU 10 and the cryptographic processor (CP) 11 may be interconnected via system bus 14 to various devices such as a random-access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device 104 can read the inventive instructions on the program storage devices and follow these instructions to execute the methodology of the embodiments herein. The user device 104 further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

In some embodiments, the system 100 generates the target segment, and the individualized offer using a following snippet,

```
#Program
    private List<String> generateOffers(MemberSegmentation memberSegmentation,
Member member, Program program) {
        log.info("Getting offers for member: " +
memberSegmentation.getMemberSegmentationId( ) +
        " with segmentation attributes: " +
memberSegmentation.getSegmentAttributes( ));
        List<String> offers = new ArrayList<>( );
        Map<String, String> attributes = new
HashMap<>(memberSegmentation.getSegmentAttributes( ));
        boolean flag;
        if (MembershipStageUtil.isMembershipStageTest(member, program)) {
            return offers;
        }
        for (int i = 0; i < templateOfferInfos.size( ); i++) {
            TemplateOfferInfo templateOfferInfo = templateOfferInfos.get(i);
            if (templateOfferInfo.getStatus( ).equals(TemplateOfferStatus.SUCCESS)
                &&
templateOfferInfo.getTemplateOfferRequest( ).getMemberTargetType( ).equals("criteria")) {
                for (Map.Entry<String, List<Map<String, List<String>>>> entry :
templateOfferInfo.getMemberTargeting( ).entrySet( )) {
                    List<Map<String, List<String>>> listOfMemberTargetConditions = new
ArrayList<>(entry.getValue( ));
                    for (Map<String, List<String>> memberTargetingAttrComp :
listOfMemberTargetConditions) {
                        flag = true;
                        //log.debug("target_conditions: { }", memberTargetingAttrComp);
                        for (Map.Entry<String, List<String>> resultSet :
memberTargetingAttrComp.entrySet( )) {
                            if (Utilities.isNullOrEmpty(attributes.get(resultSet.getKey( )))
                                || !resultSet.getValue( ).contains(attributes.get(resultSet.getKey( )))) {
                                flag = false;
                                break;
                            }
                        }
                        if (flag) {
                            offers.add(templateOfferInfo.getOfferId( ));
                            break;
                        }
                    }
                }
            }
        }
        return offers;
    }
```

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for training and deploying a machine learning and analytics model for dynamically generating an automated individualized combination of attributes for each member identity (ID) in a plurality of target segments, the method comprising the steps of:
    training the machine learning and analytics model by correlating historical target segments with historical member IDs, historical member data, historical user requirements historical base combination of attributes, and historical unique value propositions;
    identifying, using the machine learning and analytics model at a server, a target segment from the plurality of target segments for each member ID by ingesting, using a processor, member data, and third-party data of each member ID, wherein the target segment comprising a plurality of member IDs associated with a plurality of members in the target segment;
    generating, by the machine learning and analytics model, a base combination of attributes from a plurality of base combination of attributes for the target segment, wherein the base combination of attributes comprises a numerical part and a logical part;
    generating a rule for the base combination of attributes associated with the target segment from a rules database; and
    dynamically generating the automated individualized combination of attributes for each member ID in the target segment based on the rule that is generated for the base combination of attributes associated with the target segment in real-time while processing transactional data of each member ID, wherein the machine learning and analytics model dynamically generates the automated individualized combination of attributes by, receiving, from a user device associated with each member ID in the target segment, a selection of a set of attributes from a plurality of attributes associated with the member data, wherein the set of attributes comprises a set of static attributes and a set of mathematical attributes; and generating the automated individualized combination of attributes for each member ID in the target segment by applying the set of static attributes and the set of mathematical attributes on the base combination of attributes for the plurality of member IDs in each target segment.

2. The method of claim 1, wherein the set of mathematical attributes comprises a spending objective, which is applied on the rule of the base combination of attributes, wherein the set of static attributes comprises a product category or a product sub-category which is applied on the rule of the base combination of attributes.

3. The method of claim 1, wherein the set of mathematical attributes comprises combination of attributes start date or combination of attributes end date, which operates on the rule of the base combination of attributes, wherein the automated individualized combination of attributes pertaining to the combination of attributes start date or the combination of attributes end date for each member ID in the target segment is generated based on the set of static attributes associated with each member ID.

4. The method of claim 1, wherein the set of mathematical attributes comprises a qualifying product category or a qualifying product, which operates on the rule of the base combination of attributes, wherein the automated individualized combination of attributes pertaining to the qualifying product category or the qualifying product for each member ID in the target segment is generated based on the set of static attributes associated with each member ID.

5. The method of claim 1, wherein the set of mathematical attributes comprises a qualifying flight route or a qualifying destination, which operates on the rule of the base combination of attributes, wherein the automated individualized combination of attributes pertaining to the qualifying flight route or the qualifying destination for each member ID in the target segment is generated based on the set of static attributes associated with each member ID.

6. The method of claim 1, wherein the method comprises generating individualized segments of each member ID based on the selection of the set of static attributes of each member ID.

7. The method of claim 1, wherein the base combination of attributes is divided into the individualized combination of attributes at a unique value proposition to each member ID in the target segment using the machine learning and analytics model.

8. The method of claim 1, wherein the target segment is created in real-time based on a requirement of each member ID using the machine learning and analytics model.

9. The method of claim 1, wherein the member data and the third-party data comprise at least one predetermined information of a personal action, a transaction action, and an online action performed on one or more social media in the user device.

10. The method of claim 1, wherein the set of mathematical attributes is performed on the numerical part or the logical part of the base combination of attributes, wherein the set of static attributes performs on the plurality of member IDs to match the set of static attributes.

11. The method of claim 1, wherein the method comprises calculating differential combination of attributes for each member ID in the target segment based on a unique combination of the set of static attributes and the set of mathematical attributes along with the transactional data and the member data.

12. A system for training and deploying a machine learning and analytics model for dynamically generating an automated individualized combination of attributes for each member identity (ID) in a plurality of target segments, the system comprising:

a memory that stores a set of instructions;

a processor that is configured to execute the set of instructions and is configured to train the machine learning and analytics model by correlating historical target segments with historical member IDs, historical member data, historical user requirements historical base combination of attributes, and historical unique value propositions;

identify, using the machine learning and analytics model at a server, a target segment from the plurality of target segments for each member ID by ingesting, using a processor, member data, and third-party data of each member ID, wherein the target segment comprising a plurality of member IDs associated with a plurality of members in the target segment;

generate, by the machine learning and analytics model, a base combination of attributes from a plurality of base combination of attributes for the target segment, wherein the base combination of attributes comprises a numerical part and a logical part;

generate a rule for the base combination of attributes associated with the target segment from the rules database; and dynamically generate the automated individualized combination of attributes for each member ID in the target segment based on the rule that is generated for the base combination of attributes associated with the target segment in real-time while processing transactional data of each member ID, wherein the machine learning and analytics model dynamically generates the automated individualized combination of attributes by, receiving, from a user device associated with each member ID in the target segment, a selection of a set of attributes from a plurality of attributes associated with the member data, wherein the set of attributes comprises a set of static attributes and a set of mathematical attributes; and generating the automated individualized combination of attributes for each member ID in the target segment by applying the set of static attributes and the set of mathematical attributes on the base combination of attributes for the plurality of member IDs in each target segment.

13. The system of claim 12, wherein the set of mathematical attributes comprises a spending objective, which is applied on the rule of the base combination of attributes, wherein the set of static attributes comprises a product category or a product sub-category which is applied on the rule of the base combination of attributes.

14. The system of claim 12, wherein the set of mathematical attributes comprises combination of attributes start date or combination of attributes end date, which operates on the rule of the base combination of attributes, wherein the automated individualized combination of attributes pertaining to the combination of attributes start date or the combination of attributes end date for each member ID in the target segment is generated based on the set of static attributes associated with each member ID.

15. The system of claim 12, wherein the set of mathematical attributes comprises a qualifying product category or a qualifying product, which operates on the rule of the base combination of attributes, wherein the automated individualized combination of attributes pertaining to the qualifying product category or the qualifying product for each member ID in the target segment is generated based on the set of static attributes associated with each member ID.

16. The system of claim 12, wherein the set of mathematical attributes comprises a qualifying flight route or a qualifying destination, which operates on the rule of the base combination of attributes, wherein the automated individualized combination of attributes pertaining to the qualifying flight route or the qualifying destination for each member ID in the target segment is generated based on the set of static attributes associated with each member ID.

17. The system of claim 12, wherein the method comprises generating individualized segments of each member ID based on the selection of the set of static attributes of each member ID.

18. The system of claim 12, wherein the base combination of attributes is divided into the individualized combination of attributes at a unique value proposition to each member ID in the target segment using the machine learning and analytics model.

19. One or more non-transitory computer-readable storage mediums storing one or sequences of instructions, which when executed by one or more processors, causes a method of training and deploying a machine learning and analytics model for dynamically generating an automated individualized combination of attributes for each member ID in a plurality of target segments, the steps of:

training the machine learning and analytics model by correlating historical target segments with historical member IDs, historical member data, historical user requirements historical base combination of attributes, and historical unique value propositions;

identifying, using the machine learning and analytics model at a server, a target segment from the plurality of target segments for each member ID by ingesting, using a processor, member data, and third-party data of each member ID, wherein the target segment comprising a plurality of member IDs associated with a plurality of members in the target segment;

generating, by the machine learning and analytics model, a base combination of attributes from a plurality of base combination of attributes for the target segment, wherein the base combination of attributes comprises a numerical part and a logical part;

generating a rule for the base combination of attributes associated with the target segment from a rules database; and dynamically generating the automated individualized combination of attributes for each member ID in the target segment based on the rule that is generated for the base combination of attributes associated with the target segment in real-time while processing transactional data of each member ID, wherein the machine learning and analytics model dynamically generating the automated individualized combination of attributes by, receiving, from a user device associated with each member ID in the target segment, a selection of a set of attributes from a plurality of attributes associated with the member data, wherein the set of attributes comprises a set of static attributes and a set of mathematical attributes; and generating the automated individualized combination of attributes for each member ID in the target segment by applying the set of static attributes and the set of mathematical attributes on the base combination of attributes for the plurality of member IDs in each target segment.

\* \* \* \* \*